Jan. 19, 1932.  J. E. LORENTZ  1,842,353
TIRE CONSTRUCTION
Filed March 3, 1930  2 Sheets-Sheet 1

INVENTOR

Jan. 19, 1932.          J. E. LORENTZ          1,842,353
                         TIRE CONSTRUCTION
                       Filed March 3, 1930          2 Sheets-Sheet 2

INVENTOR
John E. Lorentz

Patented Jan. 19, 1932

1,842,353

UNITED STATES PATENT OFFICE

JOHN E. LORENTZ, OF AKRON, OHIO, ASSIGNOR TO THE INDIA TIRE & RUBBER COMPANY, OF MOGADORE, OHIO, A CORPORATION OF OHIO

TIRE CONSTRUCTION

Application filed March 3, 1930. Serial No. 432,649.

The present invention relates to the construction of pneumatic tires and particularly to improvements in that portion of the tire occupied by the breaker strip.

The invention herein described and claimed is in the nature of an improvement upon cord breaker constructions now in use following the teachings of the Lerch Patent No. 1,462,453, dated July 17, 1923.

The object of the breaker strip is to receive the blows or shocks delivered to the tread of the tire and to dissipate and distribute those shocks in such a manner as to prevent tread separation. The use of the cord breaker is particularly valuable in the construction and operation of large pneumatic tires such as used on heavy vehicles as trucks or busses where the loads and shocks are very high and the tendency to tread separation is pronounced. The breaker strip also serves to transmit the torque from the tread to the carcass and to perform other recognized functions in the operation of the tire.

By the improved form of breaker strip shown herein, the beneficial results obtained by the use of a cord breaker construction are increased and superior results are obtained. The arrangement of the layers of cord fabric which constitute the breaker strip effectually eliminates harmful hinging action at the edges of the breaker strip which causes the separation of the tread from the carcass of the tire.

The breaker strip is an extremely important element of the tire construction and has presented a very serious problem to the tire manufacturer. The cord breaker such as shown and described in the Lerch patent referred to above has been a great improvement over earlier forms of breakers, but the present design secures even more satisfactory results. The hinging action is minimized and localized action prevented so that tread separation from these causes is entirely obviated.

The construction of tire shown and described herein utilizes the cord fabric or a plurality of parallel cord elements as the fabric material for the breaker strip, but instead of a plurality of breaker strips extending across the central plane of the tire beneath the tread area, the invention utilizes a plurality of narrower strips of fabric which are arranged in such manner that each strip supports in a measure the strip on either side thereof, the strips being laid in stepped relation to one another and in spaced groups upon opposite sides of the tire. The breaker element is composed of a plurality of narrow strips, preferably with a single strip on the outside of the breaker and similar strips placed beneath the outer strip and arranged in stepped relation thereto. The strips which are independent of one another in the two groups are laid in a manner similar to or simulating the positioning of shingles so that each strip is partially supported by the adjacent strips.

For a full and complete understanding of the new form of tire construction, reference is made to the detailed description of the invention and the illustration thereof contained in the drawings, but it will be understood that changes or modifications may be incorporated in specific embodiments of the invention which it is the intention to cover herein.

In the drawings in which the best known or preferred forms of the invention are illustrated and described:

Figure 1:
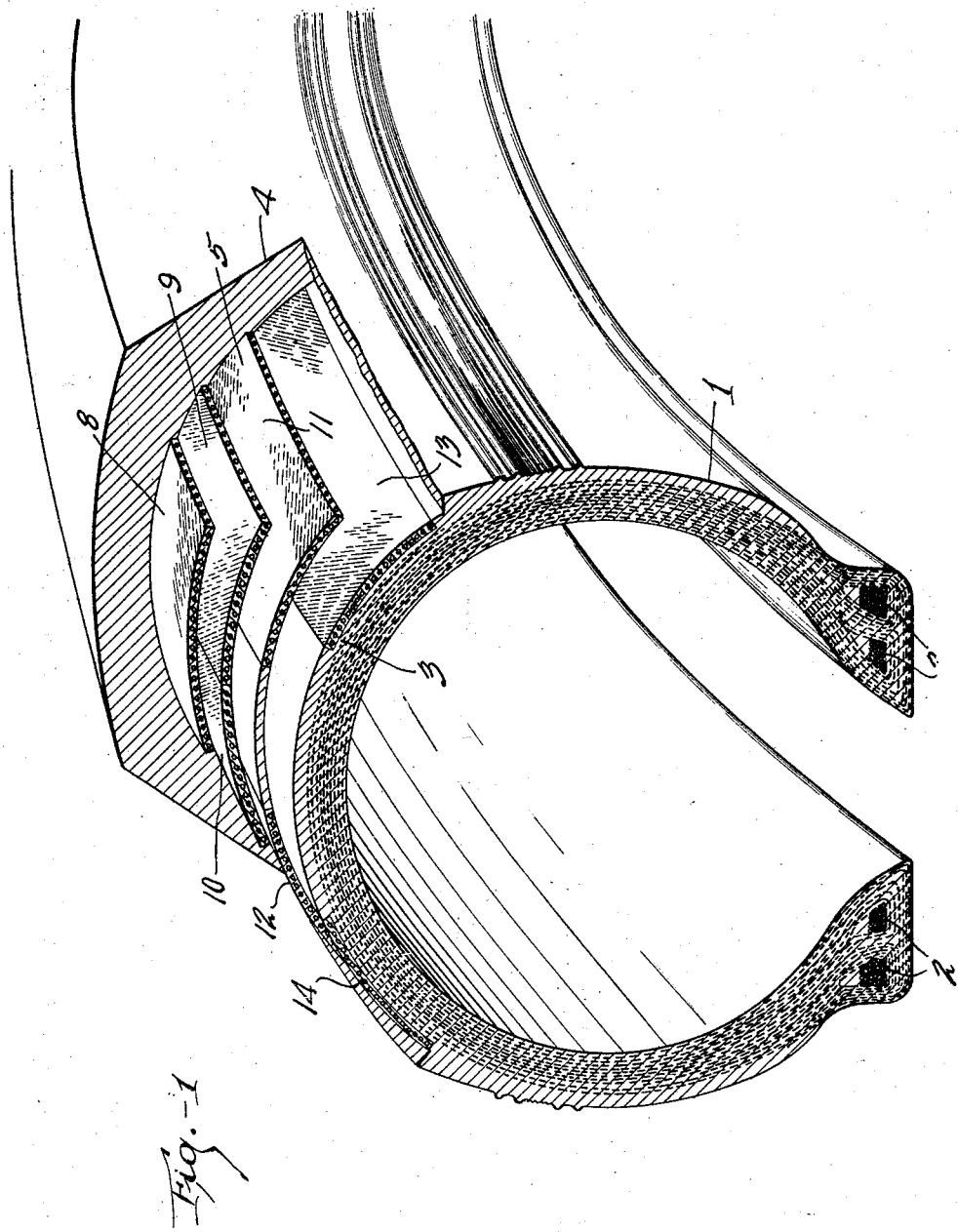
Figure 1 is a perspective view of a tire section, parts being broken away or stepped off to illustrate the manner in which the breaker strips are applied.
Figure 2:
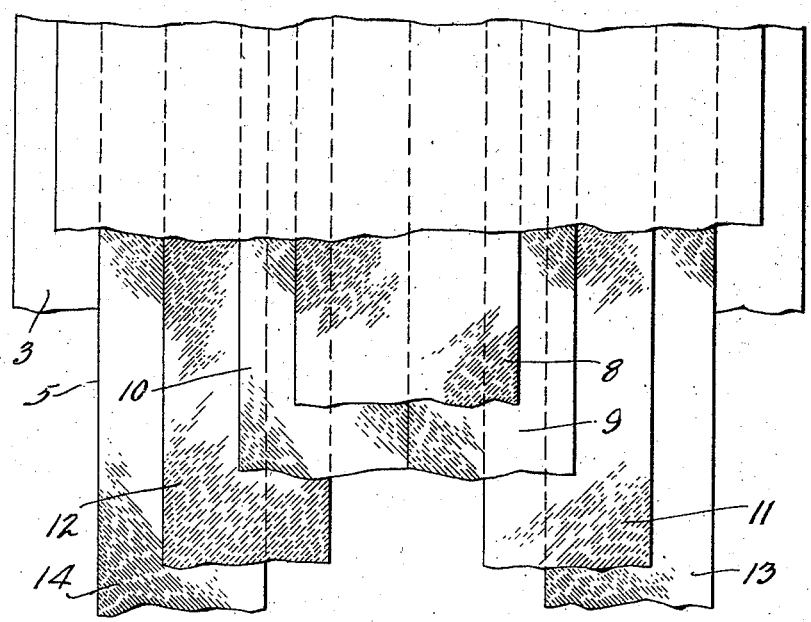
Figure 2 is a detail plan view of the breaker element as shown in Figure 1, removed from the tire.

A tire of the usual or preferred construction is shown herein, in which the carcass of the tire is indicated at 1, being composed of the usual layers or plies of diagonally arranged fabric, usually cord fabric rubberized in the known manner and assembled as is usual in pneumatic tire constructions. There have been illustrated a large number of plies such as usually are employed in the manufacture of tires of large cross-section especially adapted for heavy duty, although the invention may be employed in all sizes of tires for various conditions of wear or service.

The bead elements of the tire are indicated at 2, the plies of the carcass being brought around or tied into the beads as is usual in tire constructions. Over the carcass is placed the layer of highly resilient rubber known as the cushion, this cushion usually extending within the tread area or region of the tire and serving to receive and cushion the blows from the carcass. A tread is indicated at 4, and in the particular tire construction illustrated, this tread element also forms the sidewalls of the tire, although distinct sidewalls may be employed. The tread is composed of a relatively stiff, abrasion resisting rubber compound adapted to withstand the wear to which the tire is subjected. It is necessarily less flexible than the cushion, but is more flexible than the relatively stiff carcass.

The breaker element, which is placed over the cushion 3, operates to transmit the blows and shocks from the tread to the carcass through the cushion and its function is as has been described. It is, however, the liability of the separation of the tread under the stresses of the action set up between the tread and the carcass which the breaker strip offsets.

In the improved form of tire construction the breaker element is indicated as a whole by the numeral 5. It is composed of a plurality of narrow layers of cord fabric, the cords of which are parallel and the strips are heavily coated with rubber of a highly resilient character similar to the cushion stock. The cords are either held together solely by the rubber which surrounds them and in which they are embedded, or minutely spaced filling threads may be used. The breaker fabric of either type is cut on an angle so that the cords are arranged diagonally with respect to the plane of the tire, the degree of the angle being subject to variation as directed by the judgment of the tire maker. Adjacent layers or plies are arranged at opposite angles so that the cords cross each other within the breaker element. The spacing of the cords is largely optional with the tire maker, it being necessary merely that sufficient rubber be interposed between the adjacent cords to constitute a ribbon or web of rubber passing down through the cord breaker elements to operate as "rivets" holding the tread to the carcass of the tire.

In the preferred form of the invention, the breaker element is composed of a single narrow layer of cord 8 or cord fabric as described herein, placed centrally of the tread. Beneath this layer of cord are located two second strips 9 and 10 somewhat narrower than the strip 8, with their respective cords running in the same direction, but with the layers spaced apart at their adjacent edges, so that the layers or strips are entirely independent of one another. The degree of spacing of the strips may be varied, but it will be observed that the strip 8 is supported on its opposite sides by two independent layers. Beneath the layers 9 and 10 and spaced apart at a somewhat greater distance are the two narrow strips 11 and 12. It will be observed that cords of these strips are laid in directions opposite to the direction of the cords in strips 9 and 10 and that each of these strips underlies a portion of the strip just above to support the same and may extend also beneath the edge portion of the strip 8. In a similar manner the strips 13 and 14 spaced still farther apart underlie the strips 11 and 12, respectively, and also in a measure the strips 9 and 10.

It will be observed that as illustrated all of the strips, except the somewhat wider strip 8, are of equal or substantially equal width and that each strip is supported by at least two strips, but these details are not necessarily followed in all tire constructions, it being important merely that the several strips on each side on the center line of the tire are arranged in such manner that the outer edge portion of the strips are successively supported by its subjacent, and preferably by two subjacent strips. It will be observed that the strips 9, 11 and 13 constitute one group of strips and 10, 12 and 14 constitute a second group, these groups being spaced from the central plane of the tire.

The spaces between the edges of the strips are filled with cushion rubber and additional cushion rubber may be placed between the several strips if desired. In the vulcanization of the tire, the breaker strips may vary somewhat from the exact position in which they are laid, a result which does not injuriously affect the action of the tire.

Figure 3:
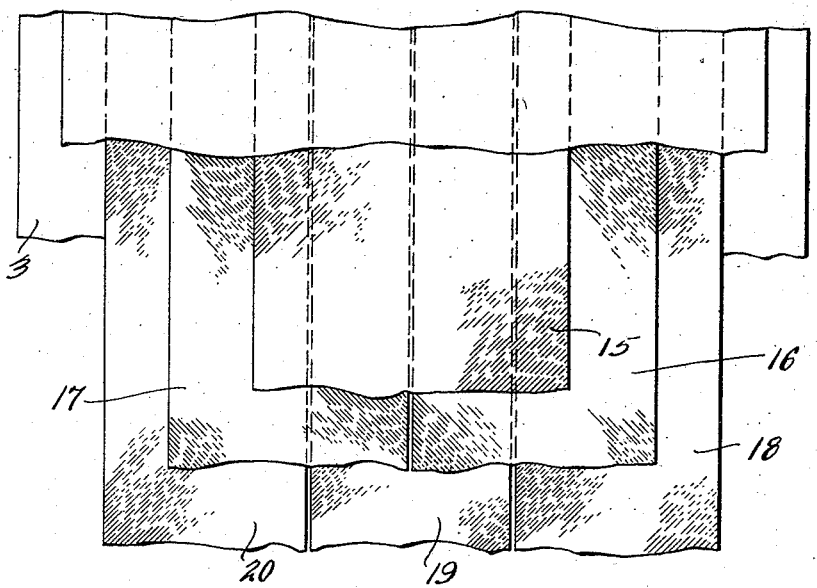
Figure 3 is a similar plan view of a modification of the invention.

In the modification of the invention as shown in Figure 3, the central strip 15 is somewhat wider than the strip 8, and the next strips 16 and 17 are somewhat narrower and laid as shown so that they underlie the two edge portions of the strip 15. Beneath the strips 16 and 17 are located the three still narrower strips 18, 19 and 20, which support the strips 16 and 17.

In any form of the tire as shown and described, the blows or shocks are transmitted from one strip to the strip beneath and so inwardly of the tire until the innermost strips are reached, by which time the blows or shocks are dissipated and dispersed in such manner as to prevent localization of the separative forces. The innermost strips being separated upon opposite sides of the center line of the tire, the shocks are not transmitted across the tire but will disappear in such manner as to avoid the destructive effects thereof.

The above theory of the successful operation is not given with the idea that it is exact or controlling. It has been found that tires constructed in accordance with the invention as described have given substantially greater mileage than earlier forms of tires and that tread separation is reduced or eliminated under conditions of service which would give tread separation in other forms of breaker constructions. The invention gives excellent results in the prevention of tread separation, and as the principles thereof are new and novel the claims are entitled to a broad scope sufficient to cover variations, modifications or improvements in the combinations described therein.

What is claimed is:

1. A tire construction comprising a carcass composed of layers of rubberized fabric, a layer of cushion rubber over the carcass, an outer layer of wear resisting rubber constituting the tread, and a breaker element between the cushion layer and the tread of the tire, said element being composed of a central strip of parallel rubberized cords placed in an oblique position with respect to the plane of the tire and a plurality of similar strips positioned inwardly of said central strip, the said strips being separated at the center of the tire into two groups upon either side thereof and projecting at progressively greater distances apart inwardly of the tire.

2. A tire construction comprising a carcass composed of layers of rubberized fabric, a layer of cushion rubber over the carcass, an outer layer of wear resisting rubber constituting the tread, and a breaker element between the cushion layer and the tread of the tire, said element being composed of a central strip of parallel rubberized cords placed in an oblique position with respect to the plane of the tire and a plurality of similar strips disposed inwardly of said central strip, the said strips being separated at the center of the tire into two groups upon either side thereof and projecting at progressively greater distances apart inwardly of the tire, the cords in adjacent strips lying at angles to each other.

3. A tire construction comprising a carcass, a layer of cushion rubber over the carcass, an outer layer of wear resisting rubber constituting the tread, and a breaker element between the cushion layer and the tread of the tire, said element comprising narrow strips of parallel rubberized cords arranged in separated groups upon opposite sides of the central plane of the tire and in progressively remote positions from the central plane of the tire in the tread region.

4. A tire construction having a breaker element between the tread and the carcass, said element comprising strips of rubberized parallel cords, one of said strips being placed centrally of the tread of the tire and successively narrower strips inwardly of the central strip, said successive strips being situated on opposite sides of the central plane of the tire and located so that their respective edges recede from the central plane of the tire inwardly thereof.

5. A tire construction having a breaker element between the tread and the carcass, said element comprising strips of rubberized parallel cords, one of said strips being placed centrally of the tread of the tire and successively narrower strips inwardly of the central strip, said successive strips being situated on opposite sides of the central plane of the tire and located so that their respective edges recede from the central plane of the tire inwardly thereof, the cords constituting the strips being arranged obliquely of the tire.

6. A tire construction having a breaker element between the tread and the carcass, said element comprising strips of rubberized parallel cords, one of said strips being placed centrally of the tread of the tire and successively narrower strips inwardly of the central strip, said successive strips being situated on opposite sides of the central plane of the tire and located so that their respective edges recede from the central plane of the tire inwardly thereof, the cords constituting the strips being arranged obliquely of the tire and transversely of each other in adjacent strips.

7. A tire construction having a breaker element composed of strips of fabric, the outermost of said strips being centrally positioned laterally of the tire and successive strips inwardly thereof arranged in groups on opposite sides of the central plane of the tire, at progressively increased distances from the central plane thereof.

8. A tire construction having a breaker element composed of strips of spaced parallel cords, the outermost of said strips being centrally positioned laterally of the tire and successive strips inwardly thereof arranged in groups on opposite sides of the central plane of the tire, at progressively increased distances from the central plane thereof.

9. A tire construction having a breaker element composed of strips of spaced parallel cords disposed at opposite angles in adjacent strips, one of said strips being centrally disposed laterally of the tire and successive strips inwardly thereof arranged in groups on opposite sides of the central plane of the tire, at progressively increased distances from the central plane thereof.

10. A tire construction having a breaker element composed of a plurality of superposed strips of rubberized parallel cords with the cords in adjacent strips disposed transversely of each other, the edges of the strips being offset, and an edge of each strip being located substantially midway between the edges of the next adjacent strip.

11. A tire construction having a breaker element composed of a plurality of superposed strips of rubberized parallel cords with the cords in adjacent strips disposed transversely of each other, an edge of each strip being located between the edges of the next subjacent strip, the said strips being arranged in two groups in which successive strips are positioned at progressively increased distances from the central plane of the tire.

12. A tire construction having a breaker element composed of a plurality of superposed strips of rubberized parallel cords with the cords in adjacent strips disposed at angles to each other, an edge of each strip being located between the edges of the next subjacent strip, the said strips being arranged in two groups located inwardly of a central strip, the strips of said groups being positioned at progressively greater distances from the central plane of the tire in the direction of the carcass.

13. A tire construction having a breaker element composed of a plurality of narrow strips arranged in superposed layers, the number of strips in the layers increasing progressively inwardly of the tire, the strips being laid to break joints with the strip or strips in the adjacent layer.

14. A tire construction comprising a breaker element composed of a plurality of superposed strips of rubberized parallel cords with the cords in adjacent strips disposed at angles to each other, an edge of each strip being positioned between the edges of the next adjacent strip, the said strips being arranged in two groups disposed inwardly of a central strip, successive strips in each group being positioned at progressively greater distances laterally of the central plane of the tire.

J. E. LORENTZ.